(12) United States Patent
Bae et al.

(10) Patent No.: US 9,203,240 B2
(45) Date of Patent: Dec. 1, 2015

(54) METHOD AND SYSTEM FOR POWER CONTROL OF ELECTRICAL DEVICES USING MAXIMUM POWER CONTROL ALGORITHM

(75) Inventors: Young-Ho Bae, Seoul (KR); Weon-Yong Joo, Seoul (KR)

(73) Assignee: KT Corporation, Seongnam-Si (KR)

( * ) Notice: Subject to any disclaimer, the term of this patent is extended or adjusted under 35 U.S.C. 154(b) by 568 days.

(21) Appl. No.: 13/614,957

(22) Filed: Sep. 13, 2012

(65) Prior Publication Data
US 2013/0151024 A1   Jun. 13, 2013

(30) Foreign Application Priority Data
Dec. 13, 2011   (KR) ........................ 10-2011-0133493

(51) Int. Cl.
| | | |
|---|---|---|
| *G06F 1/26* | (2006.01) | |
| *H02J 3/14* | (2006.01) | |
| *G06Q 50/06* | (2012.01) | |

(52) U.S. Cl.
CPC . *H02J 3/14* (2013.01); *G06Q 50/06* (2013.01); *H02J 2003/143* (2013.01); *Y02B 70/3225* (2013.01); *Y02B 70/3266* (2013.01); *Y04S 20/222* (2013.01); *Y04S 20/242* (2013.01)

(58) Field of Classification Search
None
See application file for complete search history.

(56) References Cited

U.S. PATENT DOCUMENTS

| | | | | |
|---|---|---|---|---|
| 4,916,328 | A * | 4/1990 | Culp, III | 307/39 |
| 2003/0009265 | A1* | 1/2003 | Edwin | 700/295 |
| 2008/0046387 | A1* | 2/2008 | Gopal et al. | 705/412 |
| 2010/0134067 | A1* | 6/2010 | Baxter et al. | 320/109 |
| 2014/0025547 | A1* | 1/2014 | Boss et al. | 705/34 |

FOREIGN PATENT DOCUMENTS

| | | |
|---|---|---|
| JP | 1997-009502 | 1/1997 |
| KR | 1020090132856 A | 12/2009 |
| KR | 1020100049122 A | 5/2010 |
| KR | 1020110008358 A | 1/2011 |
| KR | 1020110044005 A | 4/2011 |
| WO | 2009032161 A2 | 3/2009 |

* cited by examiner

*Primary Examiner* — Sean Shechtman
(74) *Attorney, Agent, or Firm* — Sughrue Mion, PLLC

(57) ABSTRACT

A power control method includes: receiving a plurality of power use request information associated with a plurality of electrical devices, calculating a power consumption of the plurality of the electrical devices and an average value of the power consumption in a predetermined time period, based on the plurality of the power use request information, comparing the average value and the calculated power consumption in the predetermined time period to determine at least one scheduling interval in which the calculated power consumption is greater than the average value, and performing a scheduling in which a maximum power use time of at least one electrical device included in the at least one determined scheduling interval is moved to another interval The power use request information may be one from among time information and power consumption information corresponding to the operation of each of the plurality of the electrical devices.

20 Claims, 6 Drawing Sheets

METHOD AND SYSTEM FOR POWER CONTROL OF ELECTRICAL DEVICES USING MAXIMUM POWER CONTROL ALGORITHM

CROSS-REFERENCE TO RELATED APPLICATIONS

This application claims priority from Korean Patent Application No. 10-2011-0133493, filed on Dec. 13, 2011, in the Korean Intellectual Property Office, the disclosure of which is incorporated herein by reference in its entirety.

BACKGROUND

1. Field

Exemplary embodiments broadly relate to a method and a system for power control of an electrical device, and more particularly, to a method and a system for power control of an electrical device based on a control algorithm that controls the maximum power usage time.

2. Description of the Related Art

Smart grid is a next generation power network that combines IT technology with an existing power network and enables power providers and consumers to exchange two-way real-time information to maximize energy efficiency and to effectively manage power supply. The smart grid is being developed for a purpose of decreasing energy waste by increasing energy efficiency and for a purpose of achieving a greenhouse gas reduction effect by activating distributed power based on renewable energy to decrease energy dependency on fossil fuels.

When such smart grid is installed, electricity costs change in real time depending on power consumption and consumers control energy consumption according to the changing electricity costs. For example, the electricity costs are lower during late night hours when power consumption is low and is higher during daytime peak hours when people's activities cause greater power consumption. This may lead to customers, who for example, charge an electric car during the late night hours when the electricity costs are lower. Such a pattern of electricity consumption is reasonably managed by charging different rates differently according to a usage time.

In an approach to control power consumption by a power provider, a power providing system that receives power from the power provider and distributes the power to consumers is provided. This system may employ a peak power system to operate a maximum demand power control system in order to resolve instability of the power supply, and maximum demand power equipment that is used for the peak power period.

The maximum demand power equipment first determines a target peak power of a power consumer, predicts an estimated power demand in a period of 15 minutes through the increase trend of current power, and shuts down several circuit loads such that the estimated power demand does not exceed the peak power, thereby adjusting power consumption to be less than a target power.

Also, the maximum demand power controller has a built-in microprocessor installed therein such that a power load is always monitored, the estimated power demand is predicted for the period of 15 minutes, and several circuit loads are shut down for the estimated power demand not to exceed the peak power, thereby adjusting power consumption to be less than a target power.

Further, the maximum demand power controller has a built-in microprocessor installed therein such that the power load is always monitored, and when it is estimated that the power load will exceed a predefined target peak power within 15 minutes, an alarm is generated as well as power is shut down to unnecessary loads (preset loads) up to 8 loads in sequence to suppress the maximum demand power to be equal to or lower than the target power, and when the load is decreased, the loads are again introduced in sequence by a program set in advance. In other words, the maximum demand power controller controls to shut down power provided to the load such that power consumption may not exceed the target power, thereby maintaining the power consumption.

However, there is a problem in that the load that can be controlled by the maximum demand power controller is limited to, for example, an air conditioner, a refrigerator, or air conditioning equipment in a building. Moreover, a one-way control approach to control the peak power by simply cutting off power is inconvenient to the user.

SUMMARY

Accordingly, the exemplary embodiments address the above problems, and the is the exemplary embodiments provide a method of controlling a maximum demand power in a consumer unit or a group of consumer units such as home or a building may be controlled by controlling a maximum power consumption time and a renewable energy use time in a maximum demand power controller.

The technical objects of the exemplary embodiments are not limited by the above technical objects, and other technical objects that are not mentioned will be understood by a person of ordinary skill in the art from the following description.

According to an aspect of an exemplary embodiment, a method of controlling a maximum demand power of a plurality of electrical devices operated by a power provided from a power provider includes (a) receiving a plurality of power use request information associated with the plurality of the electrical devices; (b) calculating an entire power consumption of the plurality of the electrical devices in a unit of a predetermined time period, based on the plurality of the power use request information, and an average value of the entire power consumption; (c) comparing the average value in the unit of the predetermined time period and the entire power consumption to determine at least one scheduling interval of which entire power consumption is greater than the average value; and (d) performing a first scheduling in which a maximum power use time of at least one electrical device included in the at least one determined scheduling interval is moved to an interval to be scheduled.

According to another aspect of an exemplary embodiment, a system for controlling a maximum demand power of a plurality of electrical devices operated by a power provided from a power provider includes a gateway configured to generate a plurality of power use request information based on power consumption information which is information about power provided from the power provider and consumed by the plurality of the electrical devices; and a maximum demand power controller configured to receive the plurality of the power use request information from the gateway, configured to calculate an entire power consumption of the plurality of the electrical devices in a unit of a predetermined time period, based on the plurality of the power use request information, and configured to perform a power time scheduling in which a maximum power use time of at least one electrical device is moved based on the calculated entire power consumption.

According to another aspect of an exemplary embodiment, a power control system includes: an analyzer which analyzes a power use pattern based on power consumption information of each electrical device of a plurality of electrical devices and generates power use request information for said each electrical device; and a controller which controls the plurality of electrical devices according to power use scheduling information based on the generated power use request information. The power use request information may include at least one from among time information and power consumption information corresponding to the operation of each of the plurality of the electrical devices.

The power control system may also include a storage module which stores the power use request information; and a communication module which receives the power consumption information about the plurality of electrical devices and transmits the power use request information to a maximum demand power controller.

According to another aspect of an exemplary embodiment, a power control system includes: a power use information device which calculates power consumption information of a plurality of electrical devices in a predetermined time period based on power use request information of each of the plurality of electrical devices; and a power scheduler which performs scheduling in which a maximum power use time of at least one electrical device from among the plurality of electrical devices is moved based on the calculated power consumption. The power use request information may include at least one from among time information and power consumption information corresponding to the operation of each of the plurality of the electrical devices.

The power control system may also include a storage module which stores data obtained by the power use information device and the power scheduler; and a communication module which receives the power use request information of each of the plurality of electrical devices and transmits the power consumption information.

BRIEF DESCRIPTION OF THE DRAWINGS

The above and other aspects of the exemplary embodiments will be more clearly understood from the following detailed description of the exemplary embodiments taken in conjunction with the accompanying drawings, in which.

DETAILED DESCRIPTION OF EXEMPLARY EMBODIMENTS

Exemplary embodiments are described in detail with reference to the accompanying drawings in detail. The same reference numbers are used throughout the drawings to refer to the same or like parts. Detailed descriptions of well-known functions and structures incorporated herein may be omitted to avoid obscuring the subject matter of the exemplary embodiments.

Exemplary embodiments relate to a method and a system for power control of an electrical device, and more particularly, exemplary embodiments suggest a method and a system for power control of an electrical device based on maximum power usage time.

Figure 1:
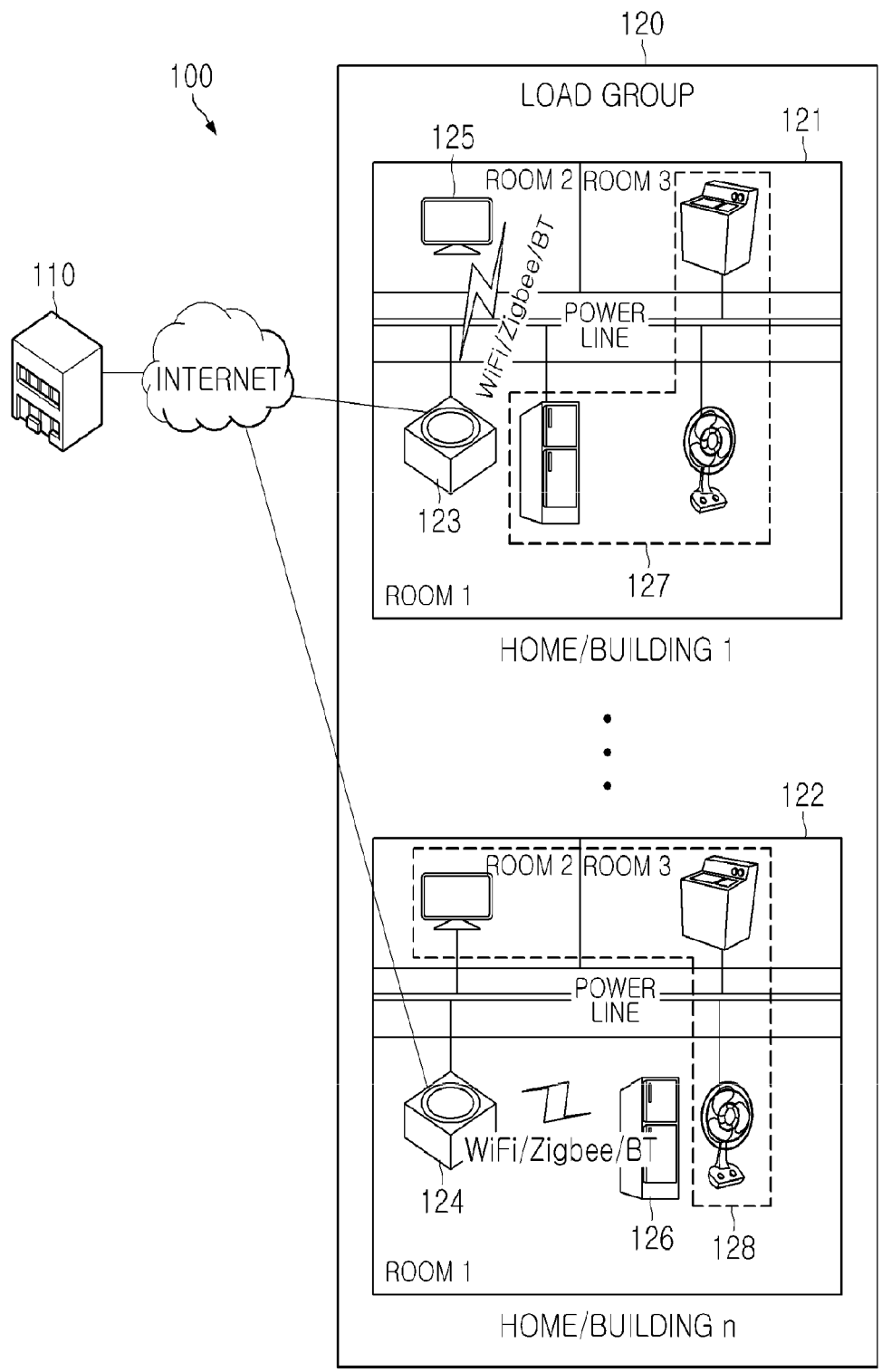
FIG. 1 is a view illustrating an exemplary power control system of an electrical device using a method of controlling maximum power use time according to an exemplary embodiment.

FIG. 1 is a view illustrating an exemplary power control system of an electrical device using a method of controlling maximum power use time according to an exemplary embodiment.

Referring to FIG. 1, a power control system 100 according to an exemplary embodiment includes a maximum demand power controller 110 and a load group 120 comprising a plurality of electrical devices. The load group 120 comprises a home/building/multi-unit building 121, 122 based on a smart grid.

Each of the home/building/multi-unit building 121, 122 of a load group 120 includes a plurality of electrical devices such as, for example, a TV, washing machine, a refrigerator, and a fan. Each of the home/building/multi-unit building 121, 122 includes smart boxes 123, 124 that collect and measure a power demand amount to be consumed in each electrical device.

The smart boxes 123, 124, which are a type of gateway and can be referred to as a smart meter, may collect information about the power demand amount to be consumed in each electrical device directly from the electrical device or through a smart tag.

In the former case, as shown in FIG. 1, electrical devices 125, 126 may be, for example, an electric product installed at home or in a building as well as a smart electrical device to which a recent IT technology is applied such that it may be remote-controlled through wired or wireless communication. The information about the power demand amount to be consumed in each electrical device may be transmitted to the smart boxes 123, 124 through the wired or wireless communication network. In this case, each electrical device may perform, for example, a power on/off control or an operation time control according to a remote control signal of the smart boxes 123, 124.

In the latter case, electrical devices 127, 128 are connected to a power receptacle for supplying power to each electrical device and a smart tag for measuring power consumption of each electrical device is attached to each power receptacle so that the information about the power demand amount of each electrical device collected by the smart tag can be transmitted to the smart boxes 123, 124 through the wired or wireless communication network.

The smart tag is an apparatus for detecting power consumption in a small unit as well as a receiving apparatus that receives a power control signal of the smart boxes 123, 124 to remotely control an electrical device within home or a building. The smart tag is associated with a power control means that controls a power state of an electric device corresponding to the smart tag and transmits the power control signal received from the smart boxes 123, 124 to the power control means of the electrical device, thereby controlling power on/off and standby power shutdown of a corresponding electrical device.

The electrical device according to an exemplary embodiment may transmit power use request information including device specific maximum power consumption information, maximum power use time information, and general power consumption information to the smart tag or the smart box. Also, the smart tag or the smart box has a function to route the received power use request information to the maximum demand power controller 110. Alternatively, the smart boxes 123, 124 that collect the electrical device specific power consumption information may generate the power use request information to be transmitted to the maximum demand power controller 110.

Next, the smart meters 123, 124 of each home, building or multi-unit building collect power demand amount information corresponding to each electrical device to be transmitted to the maximum demand power controller 110.

The maximum demand power controller 110 according to an exemplary embodiment schedules maximum demand power use time of each electrical device based on the power demand amount information measured according to a predetermined period per each electrical device of the load group 120 to adjust the maximum demand power use time of the load group 120, thereby controlling peak power. A scheduling method may include adjusting an operation time of the electric device such that the maximum demand power use time in unit of each home, building, or multi-unit building is moved to other time slots or scheduling operation times of all electrical devices that belong to a unit of the load group 120 controlled by the maximum demand power controller 110, thereby controlling the peak power.

According to a result of scheduling, when the maximum demand power controller 110 transmits power use scheduling information to each smart box 123, 124, the smart box 123 or 124 transmits the power control signal to the controlled electrical device or smart tag according to the power use scheduling information, thereby controlling the peak power.

The maximum demand power controller 110 according to an exemplary embodiment may be a maximum demand power controller or a separate controller, included in the smart grid control system, for controlling the maximum power use time. Although, for illustrative purposes and not by way of limitation, it is described in FIG. 1 that the maximum demand power controller 110 and the smart box 123 or 124 are separate devices, exemplary embodiments are not limited thereto and the maximum demand power controller 110 and the smart box 123 or 124 may be integrated into one device.

Hereinafter, for illustrative purposes, the maximum demand power controller and the smart boxes are described as separate devices.

Figure 2:
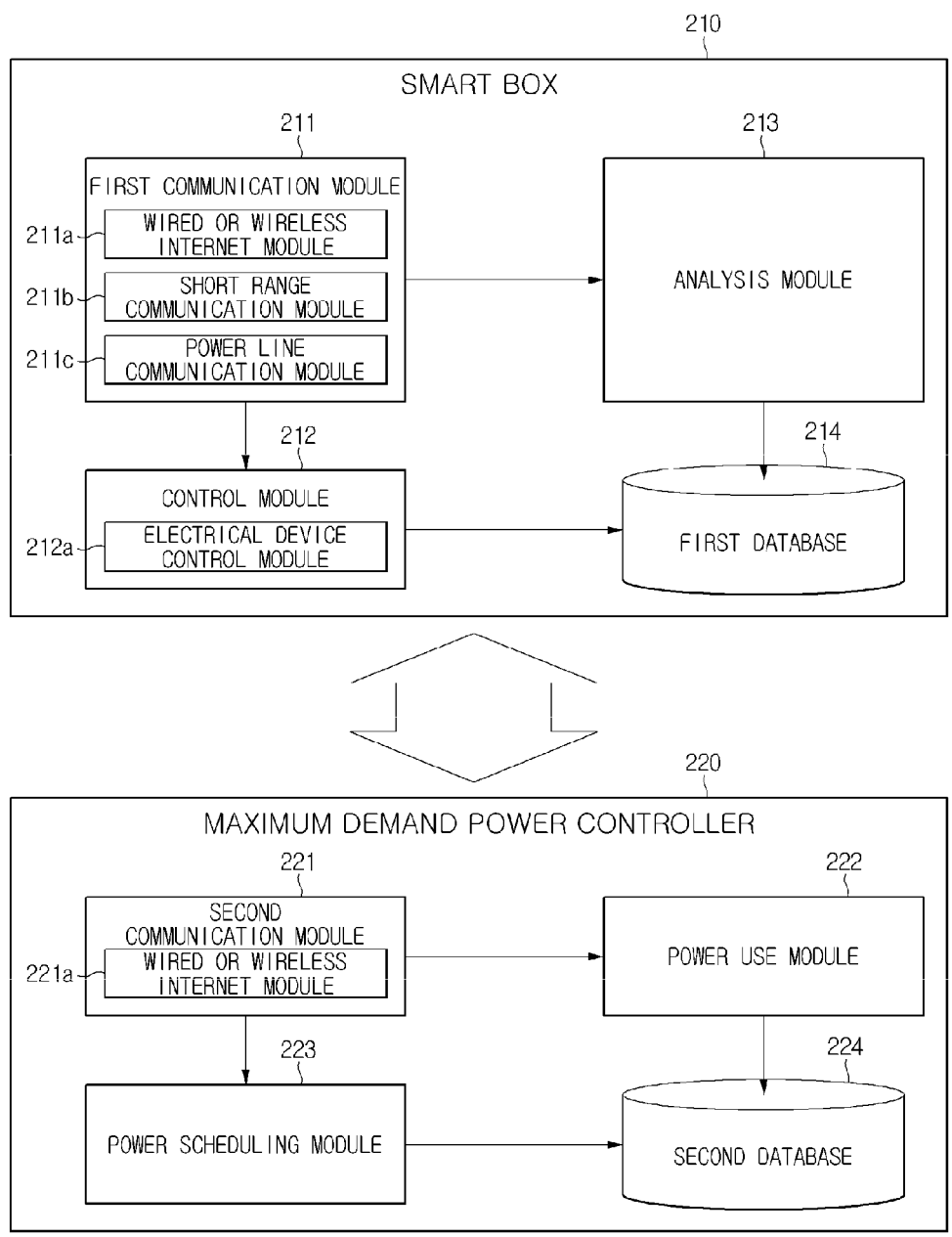
FIG. 2 is a block diagram illustrating an exemplary configuration of a power control system of an electrical device using a method of using maximum power use time according to an exemplary embodiment.

FIG. 2 is a block diagram illustrating an exemplary configuration of a power control system of an electrical device using a method of using maximum power use time according to an exemplary embodiment.

Specifically, in FIG. 2, a single smart box 210 is shown to perform wired or wireless communication with a maximum demand power controller 220; however, a plurality of smart boxes having the same function may additionally be connected to the maximum demand power controller.

Referring to FIG. 2, the smart box 210 includes a first communication module 211 for performing wired or wireless communication with external communication equipment or a communication server, an analysis module 213 (e.g., an analyzer which includes hardware and/or software components) for analyzing a power use pattern based on power consumption information of each electrical device received through the first communication module 211, a control module 212 (e.g., a controller which includes hardware and/or software components) for performing power control related to a plurality of electrical devices that are controlled by the smart box, and a first database 214 for storing an analysis data or a control data.

The first communication module 211 (e.g., a transceiver which includes hardware and/or software components) is used to perform wired or wireless communication between the smart box 210 and an electrical device that supports IT technology, the smart tag, the maximum demand power controller or the external communication equipment. The first communication module 211 includes a wired or wireless internet module 211a, a short range communication module 211b, and/or a power line communication module 211c.

The wired or wireless internet module 211a is a module for accessing wired or wireless internet. Wired or wireless internet technology including wireless LAN (WLAN), Wi-Fi, Wireless broadband (Wibro), World Interoperability for Microwave Access (Wimax), or High Speed Downlink Packet Access (HSDPA) may be used.

The short range communication module 211b is a module used for short range communication. Short range communication technology including Bluetooth, radio frequency identification (RFID), infrared data association (IrDA), ultra wideband (UWB), or ZigBee may be used.

The power line communication module 211c is a technology capable of transmitting voice, text data, or an image through an electric receptacle by means of a phone connection via high speed internet using a power line only, and power line communication (PLC) technology may be used.

The analysis module 213 analyzes the power consumption pattern based on the power consumption information of each electrical device received from the smart tag or the electrical device at a predetermined period through the first communication module 211. According to the analysis result, power use request information including maximum power consumption information, maximum power use time information or general power consumption information of each electric device may be generated. The generated power use request information may be transmitted to the maximum demand power controller 220 through the first communication module 211 and may be stored in the first database 214.

Next, the control module 212 performs an overall control operation of the smart box and includes an electrical device control module 212a that controls power conditions of a plurality of electrical devices that are controlled by the smart box.

The electrical device control module 212a transmits a power control signal to a corresponding electrical device according to power use scheduling information received from the maximum demand power controller 220 to control, for example, a power on/off switch of each electrical device, standby power shutdown, or power output level. According to a function performed by the electrical device control module 212a, a time period during which maximum power is consumed by each electrical device is adjusted such that the peak power of the load group may be controlled.

Referring now to FIG. 2, the maximum demand power controller 220 includes a second communication module 221 for performing wired or wireless communication with one or more smart box 210 or the external communication device, a power use information module 222 (e.g., a power use information device or component which includes hardware and/or software components) that produces power consumption information of a home, building or multi-unit building based on power consumption information received from the smart box 210, a power scheduling module 223 (e.g., a power scheduler which includes hardware and/or software components) that performs power use scheduling based on the power use request information received from the smart box 210, and a second database 224 that stores data obtained by the power use information module 222 and the power scheduling module 223.

The second communication module 221 may support the same communication method as the first communication module 211 and may include a module for accessing wired or wireless internet 221a using wired or wireless internet technology. Wired or wireless internet technology including wireless LAN (WLAN), Wi-Fi, Wireless broadband (Wibro), World Interoperability for Microwave Access (Wimax), or High Speed Downlink Packet Access (HSDPA) may be used to implement the wired or wireless internet module.

The power use information module 222 may calculate a time-series power consumption data of each electrical device or time-series entire power consumption data of each load in unit of a home, building or multi-unit building based on the power consumption information received from one or more smart box 210. The power consumption data calculated by the power use information module 222 is shown in FIG. 5, which will be described later.

The power scheduling module 223 schedules a maximum power use time of each electrical device for controlling the peak power based on one or more power use request information received from the smart box 210 and generates power use scheduling information accordingly.

The power use scheduling according to an exemplary embodiment will be described with reference to FIG. 3.

Figure 3:
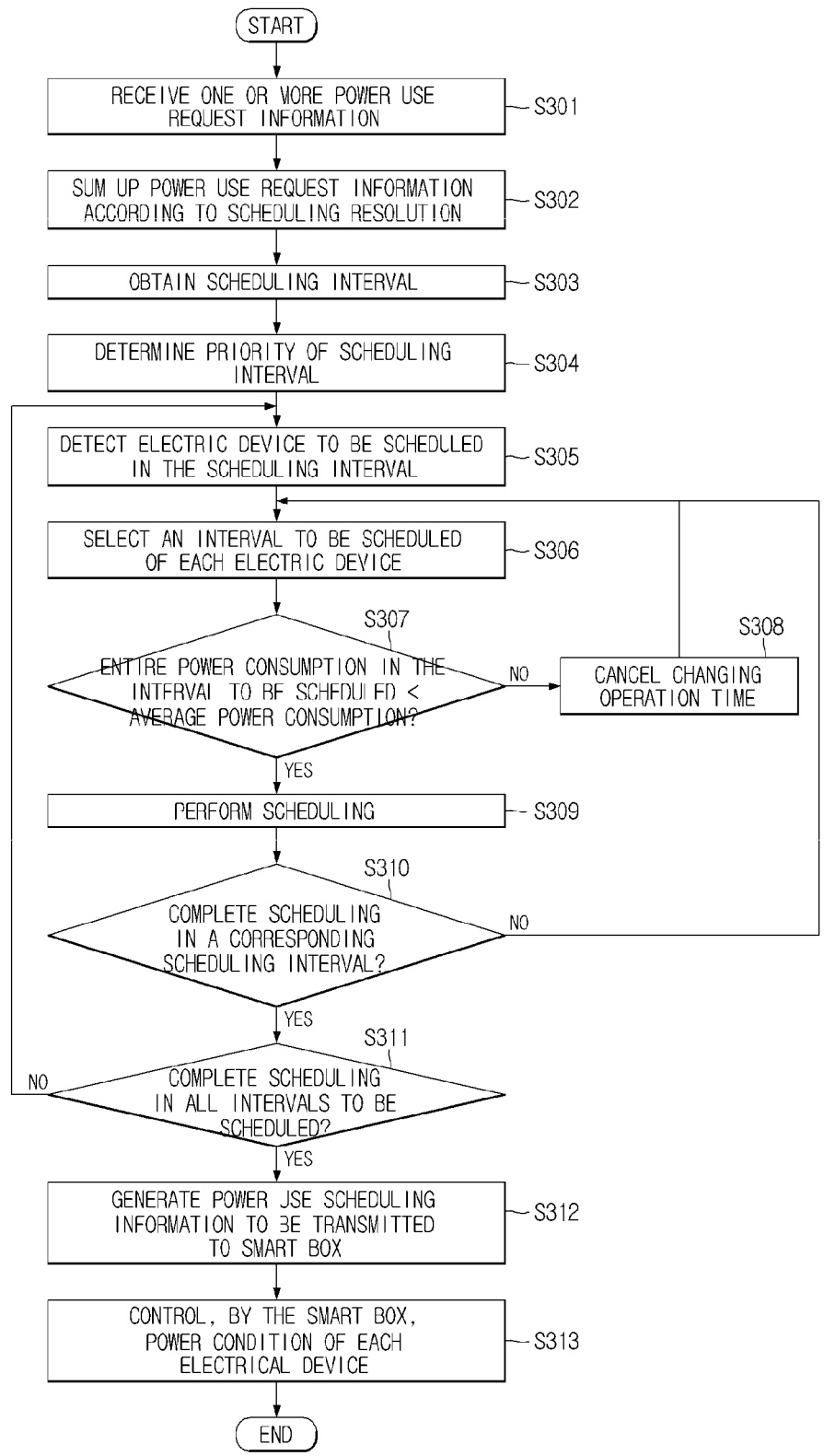
FIG. 3 is a flow chart illustrating an exemplary method of scheduling maximum power use time of each electrical device in a maximum demand power controller according to an exemplary embodiment.

FIG. 3 is a flow chart illustrating an exemplary method of scheduling maximum power use time of each electrical device in a maximum demand power controller according to an exemplary embodiment.

Referring to FIG. 3, the maximum demand power controller receives one or more power use request information from the smart box or the electrical device (Operation S301) and sums one or more received power use request information according to a scheduling resolution (Operation S302).

An example embodiment of the power use request information is shown in Table 1 and of a sum of the power use request information in unit of five minute scheduling resolution is shown in Table 2.

Table 1 shows an example of power use request information according to an exemplary embodiment.

TABLE 1

| Electric Device | Operation Start Time (min) | Maximum Power Consumption (kW) | Maximum Power Continuing Time (min) | General Power Consumption (kW) | Possible Initial Operation Time (min) | Possible Operation Delay Time (min) |
| --- | --- | --- | --- | --- | --- | --- |
| A | 0 | 10 | 15 | 5 | 0 | 10 |
| B | 0 | 25 | 10 | 5 | 0 | 0 |
| B | 25 | 25 | 10 | 5 | 10 | 0 |
| B | 50 | 25 | 10 | 5 | 10 | 0 |
| C | 0 | 15 | 10 | 5 | 5 | 10 |
| C | 20 | 15 | 5 | 5 | 0 | 10 |
| C | 25 | 15 | 5 | 5 | 5 | 10 |
| C | 40 | 15 | 10 | 5 | 0 | 10 |

Table 1 shows the power use request information generated by the analysis module 213 based on the power consumption information of electrical devices A, B, C. As shown in Table 1, the analysis module 213 may analyze, in one hour unit by a five minute scheduling resolution, an operation start time, a maximum power consumption amount, a time period during which a maximum power is continuously consumed with respect to the operating time, and general power consumption during other time slots, and an offset time (e.g., initial operation or operation delay) of a certain range based on a general operation start time of each electrical device.

Table 2 shows an example in which the power use request information according to an exemplary embodiment is summed in a five minute scheduling resolution.

TABLE 2

| Time (min) | Electric Device A (kW) | Electric Device B (kW) | Electric Device C (kW) | Sum of Power Consumption (kW) |
| --- | --- | --- | --- | --- |
| 0 | 10 | 25 | 15 | 50 |
| 5 | 10 | 25 | 15 | 50 |
| 10 | 10 | 5 | 5 | 20 |
| 15 | 5 | 5 | 5 | 15 |
| 20 | 5 | 5 | 15 | 25 |
| 25 | 5 | 25 | 15 | 45 |
| 30 | 5 | 25 | 5 | 35 |
| 35 | 5 | 5 | 5 | 15 |
| 40 | 5 | 5 | 15 | 25 |
| 45 | 5 | 5 | 15 | 25 |
| 50 | 5 | 25 | 5 | 35 |
| 55 | 5 | 25 | 5 | 35 |

Table 2 shows power consumption corresponding to each electric device and entire power consumption in units of five minutes instead of applying power use time scheduling. For example, between the 5th minute to the 10th minute of every hour on the hour, the electrical device A needs 10 kW for five minutes, the electrical device B needs 25 kW, and the electrical device C needs 15 kW, and it may be concluded that home or a building equipped with the electrical devices A, B, and C needs 50 kW for this period. In another example, between the 30th minute to the 35th minute of every hour on the hour, the electrical device A needs 5 kW, the electrical device B needs 25 kW, and the electrical device C needs 5 kW, and it may be concluded that a home or a building equipped with the electrical devices A, B, and C needs 35 kW for this period.

Referring now to FIG. 3, average power consumption is obtained from a sum of requested power consumption of all electrical devices and a particular time interval in which power consumption greater than the obtained average power consumption is requested, i.e., a time interval to be scheduled is obtained (Operation S303).

In the example embodiment shown in Table 2, an average value of entire power consumption of all electrical devices is 31.25 kW and a particular interval in which power consumption greater than the average value is during the time intervals that begin at 0, $5^{th}$, $25^{th}$, $30^{th}$, $50^{th}$ and $55^{th}$ minute.

Next, a scheduling priority is determined for the obtained time intervals from among the more than one obtained time intervals to be scheduled (Operation S304). Various methods can be used for scheduling power use time. For example, a time interval with greater power consumption may be preferentially selected while time intervals with the same power consumption are selected according to a temporal order thereof. For example, in the exemplary embodiment, the scheduling is performed in the order of the time intervals beginning at the 0, $5^{th}$, $25^{th}$, $30^{th}$, $50^{th}$, and $55^{th}$ minute.

With respect to a time interval to be scheduled according to a priority, a time interval of which power use time slot can be moved to other time slot is detected to be scheduled among a plurality of electrical devices that operate in a particular time interval selected based on power use request information received in a previous Operation, i.e., S301 (Operation S305).

Here, power use offset information such as information about initial operation and operation delay included in the power use request information and the maximum power consumption information may be used. For example, in an interval from 0 to the $5^{th}$ minute, the electrical device B cannot perform an initial operation and an operation delay, the electrical device A may perform an operation delay for 10 minutes, and the electrical device C may perform an initial operation for five minutes or an operation delay for ten minutes. Since the electrical devices A and C use maximum power in a time interval which begins at the 0 minute, the scheduling may be performed on the electrical devices A and C.

Here, when the intervals to be scheduled include two or more devices, an electrical device having greater maximum power consumption may be preferentially scheduled. In the exemplary embodiment, since the maximum power consumption of the electrical device C is greater, scheduling may be determined in an order of the electric device C and the electric device A.

Next, an interval to be scheduled is selected during which scheduling is performed according to an operation time of a corresponding electrical device that meets a predetermined condition based on the power use offset information of the selected electrical device (Operation S306).

A condition for selecting the interval to be scheduled may be determined by various methods. For example, among one or more intervals selected based on the power use offset information of the selected electrical device, an interval having lowest entire power consumption may be selected from one or more intervals having a value lower than the average entire power consumption obtained in the previous Operation i.e., Operation S303.

In the exemplary embodiment, the interval beginning at the $55^{th}$ minute of a previous time slot and the interval beginning at the $10^{th}$ minute that is later than an original operation time slot are obtained as candidate intervals to be scheduled through the offset information of the electrical device C, i.e., 5 minutes for initial operation and 10 minutes for operation delay. Between the two, a time interval that corresponds to the above described condition is the 10 minute time interval in which the entire power consumption is below the average of 31.25 kW and is a minimum value.

Here, when a maximum power use time is changed according to a scheduling result, In a case where entire power consumption during the interval to be scheduled is equal to or above the average power consumption value after the change (Operation S307—NO), the change of the maximum power use time is canceled and the scheduling is performed at another interval (Operation S308). When the entire consumption during the interval to be scheduled is less than average power consumption value after the change (Operation S307—YES), scheduling is performed (Operation S309).

In the exemplary embodiment, the maximum power use time of the electrical device C may change to the interval beginning at the $10^{th}$ minute interval beginning at the 0 minute. Accordingly, the operation time may be changed such that, during the 0 minute interval, the electrical device A consumes 10 kW, the electrical device B consumes 25 kW, and the electrical device C consumes 5 kW, and, during the 10 minute time interval, the electrical device A consumes 10 kW, the electrical device B consumes 5 kW, and the electrical device C consumes 15 kW.

Next, when the scheduling is performed on two or more devices in Operation S305, Operations S306 through Operation S309 are also performed on the rest of devices (Operation S310). In the exemplary embodiment, when the rest of the devices to be scheduled in the interval beginning at the 0 minute is the electrical device A, the interval beginning at the $10^{th}$ minute time interval may be selected as the interval to be scheduled through the offset information (10 minute for operation delay). Accordingly, the maximum power use time of the electrical device A may change to interval beginning at the $10^{th}$ minute instead of the interval beginning at the 0 minutes and the electrical device A may operate at 5 kW during the interval beginning at 0 minutes and operate at 10 kW during the interval beginning at the $10^{th}$ minute.

Accordingly, the power consumption in the intervals beginning at the 0, $5^{th}$, $10^{th}$, $15^{th}$, and $20^{th}$ minute may be changed as shown in Table 3 according to a scheduling result of the electrical devices A and C in the interval beginning at the 0 minute.

Table 3 shows a result of one time scheduling on the electrical device to be scheduled performed in one time interval through the above described process according to an exemplary embodiment.

TABLE 3

| Time (min) | Electric Device A (kW) | Electric Device B (kW) | Electric Device C (kW) | Sum of Power Consumption (kW) |
|---|---|---|---|---|
| 0 | 5 | 25 | 5 | 35 |
| 5 | 5 | 25 | 5 | 35 |
| 10 | 10 | 5 | 15 | 30 |
| 15 | 10 | 5 | 15 | 30 |
| 20 | 10 | 5 | 15 | 30 |
| 25 | 5 | 25 | 15 | 45 |
| 30 | 5 | 25 | 5 | 35 |
| 35 | 5 | 5 | 5 | 15 |
| 40 | 5 | 5 | 15 | 25 |
| 45 | 5 | 5 | 15 | 25 |
| 50 | 5 | 25 | 5 | 35 |
| 55 | 5 | 25 | 5 | 35 |

Next, Operation S305 through Operation S309 are repeatedly performed in time intervals to be scheduled determined in Operation S304 (Operation S311). In the exemplary embodiment, the intervals that can be changed to the interval to be scheduled according to the scheduling result are intervals beginning at the 0, $5^{th}$, and $25^{th}$ minute, and intervals beginning at the $30^{th}$, $50^{th}$, and $55^{th}$ minute are excluded from scheduling because a condition for changing the operation time is not satisfied.

Table 4 shows a power use time table after performing a first scheduling in which scheduling is performed in all intervals (intervals beginning at the 0, $5^{th}$, $25^{th}$, $30^{th}$, $50^{th}$ and $55^{th}$ minute).

TABLE 4

| Time (min) | Electric Device A (kW) | Electric Device B (kW) | Electric Device C (kW) | Sum of Power Consumption (kW) |
|---|---|---|---|---|
| 0 | 5 | 25 | 5 | 35 |
| 5 | 5 | 25 | 5 | 35 |
| 10 | 10 | 5 | 15 | 30 |
| 15 | 10 | 5 | 15 | 30 |
| 20 | 10 | 5 | 15 | 30 |
| 25 | 5 | 25 | 5 | 35 |
| 30 | 5 | 25 | 5 | 35 |
| 35 | 5 | 5 | 15 | 25 |
| 40 | 5 | 5 | 15 | 25 |
| 45 | 5 | 5 | 15 | 25 |
| 50 | 5 | 25 | 5 | 35 |
| 55 | 5 | 25 | 5 | 35 |

As shown in Table 4, according to the result of performing scheduling, it can be identified that the maximum power consumption is lowered from 50 kW to 35 kW after scheduling according to an exemplary embodiment.

Accordingly, the maximum demand power controller generates power use scheduling information based on a power use time table according to a result of the first scheduling performed as Table 4 and transmits the power use scheduling information to the smart box (S312).

Table 5 is given for explaining the power scheduling information generated after performing the first scheduling according to the above described exemplary embodiment.

TABLE 5

| Electric Device | Operation Start Time (min) | Maximum Power Consumption (kW) | Maximum Power Continuing time (min) | General Power Consumption (kW) |
|---|---|---|---|---|
| A | 10 | 10 | 15 | 5 |
| B | 0 | 25 | 10 | 5 |
| B | 25 | 25 | 10 | 5 |
| B | 50 | 25 | 10 | 5 |
| C | 10 | 15 | 15 | 5 |
| C | 35 | 15 | 15 | 5 |

The smart box receives the power scheduling information, of which examples are shown as in Table 5, and may adjust, for example, a power output in each time interval or power on/off control for each corresponding electrical device (Operation S313).

FIG. 3 illustrates an exemplary algorithm for controlling the peak power by controlling maximum power use time according to an exemplary embodiment. The maximum power control system may repeatedly perform a process shown in FIG. 3 until changing the maximum power use time is no longer possible.

A scheduling algorithm according to another exemplary embodiment is described with reference to FIG. 4.

Figure 4:
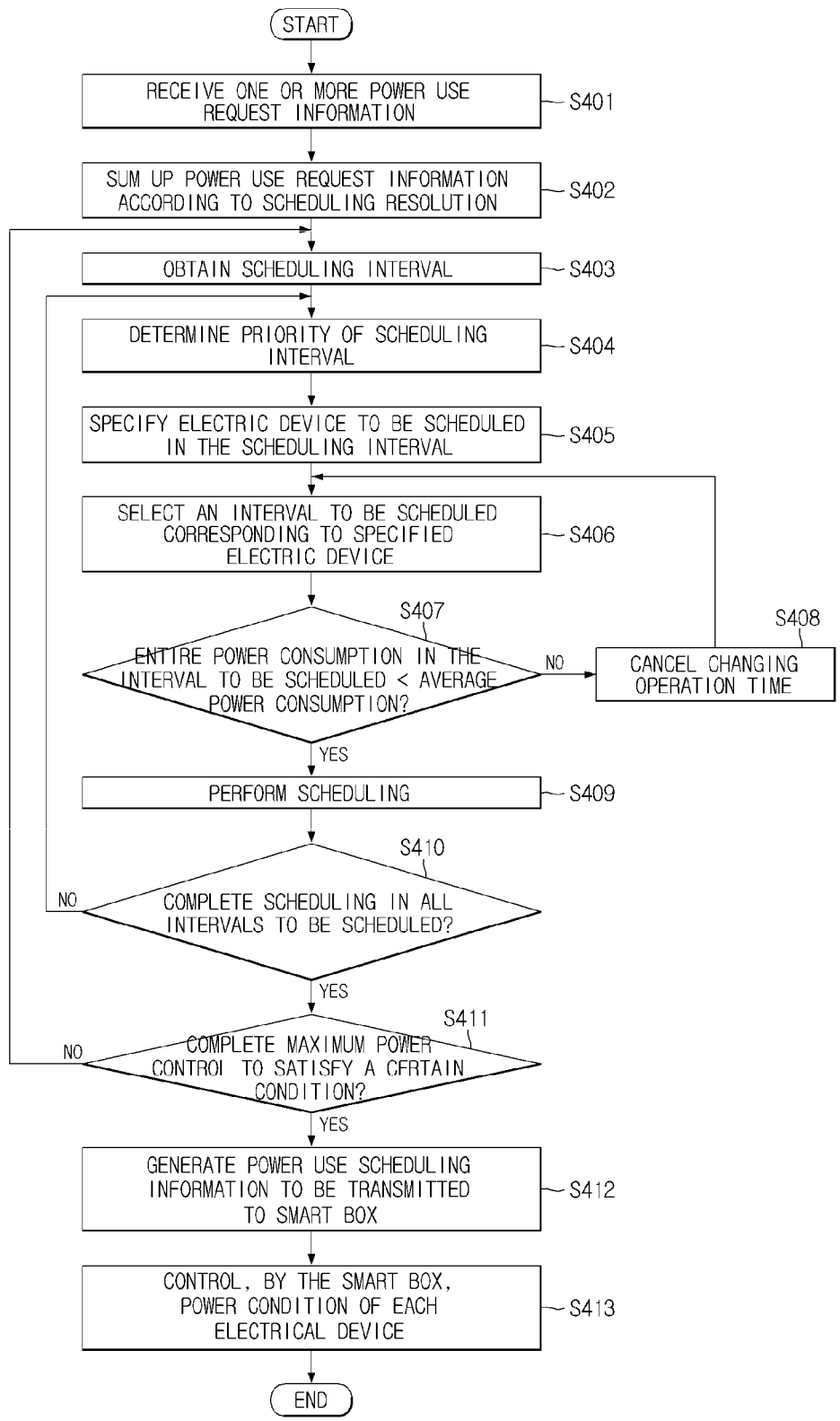
FIG. 4 is a flow chart illustrating another exemplary method of scheduling maximum power use time of each electrical device in a maximum demand power controller according to an exemplary embodiment.

FIG. 4 is a flow chart illustrating another exemplary method of scheduling maximum power use time of each electrical device in a maximum demand power controller according to an exemplary embodiment.

Referring to FIG. 4, Operation S401 through Operation S404 correspond to Operation S301 through Operation S304 in FIG. 3 described above and an identical description thereof will be omitted for purpose of brevity of the disclosure.

However, in another method of scheduling algorithm according to an exemplary embodiment, subsequent to Operation S404, with respect to a scheduling interval according to a priority, one scheduling, of which power use time slot can be moved to other time slot is specified among a plurality of electrical devices that operate in a particular interval selected based on the power use request information received in the previous Operation, i.e., Operation S401 (Operation S405).

For example, the power use offset information (information about the initial operation and the operation delay) included in the power use request information and the maximum power use information may be used. Namely, with respect to the interval beginning at the 0 minute, the electrical devices of which operation time is movable are the electrical devices A and C and, between the two, the electrical device C having greater maximum power consumption may be specified as the electrical device to be scheduled.

Next, similar to Operation S306 through Operation S309 in FIG. 3 described above, a scheduling interval is selected in which scheduling is performed according to the operation time of the corresponding electrical device that meets a predetermined condition based on the power use offset information of a selected electrical device (Operation S406) and when the maximum power use time is changed according to the scheduling result, in a case where the entire power consumption during the scheduling interval is equal to or above the average value after the change (Operation S407—NO), the change of the maximum power use time is canceled (Operation S408). In a case where the entire power consumption of an interval to be scheduled is less than the average power consumption (Operation S407—YES), scheduling is performed (Operation S409).

Table 6 shows a result of applying one time scheduling to one electrical device according to another exemplary embodiment.

TABLE 6

| Time (min) | Electric Device A (kW) | Electric Device B (kW) | Electric Device C (kW) | Sum of Power Consumption (kW) |
|---|---|---|---|---|
| 0 | 10 | 25 | 5 | 40 |
| 5 | 10 | 25 | 5 | 40 |
| 10 | 10 | 5 | 15 | 30 |
| 15 | 5 | 5 | 15 | 25 |
| 20 | 5 | 5 | 15 | 25 |
| 25 | 5 | 25 | 15 | 45 |
| 30 | 5 | 25 | 5 | 35 |
| 35 | 5 | 5 | 5 | 15 |
| 40 | 5 | 5 | 15 | 25 |
| 45 | 5 | 5 | 15 | 25 |
| 50 | 5 | 25 | 5 | 35 |
| 55 | 5 | 25 | 5 | 35 |

Thus, after performing one time scheduling, with respect to remaining scheduling intervals, the method returns to Operation S404 in which a scheduling priority is designated based on entire power consumption of each interval and Operation S405 through Operation S409 are repeatedly performed (Operation S410).

Referring to Table 6, it can be identified that at the interval beginning at the $25^{th}$ minute, in which the maximum power consumption is used after applying the one time scheduling, is a top priority scheduling interval. In case of the interval beginning at the $25^{th}$ minute, the scheduling is specified as the electrical device C according to the above described condition, and since the electrical device C can perform an operation delay of 10 minutes and the maximum power continuing time is 5 minutes, the interval beginning at the $35^{th}$ minute interval may be calculated as the scheduling interval. Accordingly, the electrical device C is scheduled such that 5 kW is used in the interval beginning at the 25$^{th}$ minute and 15 kW is used in the interval beginning at the 35$^{th}$ minute.

Accordingly, after performing scheduling twice, a level of power consumption in each interval may not be uniform. When a difference between maximum power consumption and minimum power consumption is equal to or greater than a predetermined reference, the method returns to Operation S403 in which the scheduling interval is obtained and repeatedly performs the above described process (S411).

Table 7 shows a result of the first scheduling in which power use time scheduling is performed on three intervals according to a method described in FIG. 4.

TABLE 7

| Time (min) | Electric Device A (kW) | Electric Device B (kW) | Electric Device C (kW) | Sum of Power Consumption (kW) |
|---|---|---|---|---|
| 0 | 5 | 25 | 5 | 35 |
| 5 | 5 | 25 | 5 | 35 |
| 10 | 10 | 5 | 15 | 30 |
| 15 | 10 | 5 | 15 | 30 |
| 20 | 10 | 5 | 15 | 30 |
| 25 | 5 | 25 | 5 | 35 |
| 30 | 5 | 25 | 5 | 35 |
| 35 | 5 | 5 | 15 | 25 |
| 40 | 5 | 5 | 15 | 25 |
| 45 | 5 | 5 | 15 | 25 |
| 50 | 5 | 25 | 5 | 35 |
| 55 | 5 | 25 | 5 | 35 |

Referring to Table 7, it can be identified that a same result is shown as Table 4, which is a result of performing power scheduling according to the above described method in FIG. 3.

Next, the maximum demand power controller generates power use scheduling information as Table 5, based on the power use time table according to the first scheduling result, as shown in Table 7, to be transmitted to the smart box (Operation S412) and the smart box may adjust power output of each time interval or power on/off based thereon for each corresponding electrical device (Operation S413).

Likewise, when using a scheduling algorithm according to another exemplary embodiment, the maximum power control system may repeatedly perform a process shown in FIG. 4 until the maximum power use time is no longer changeable.

Figure 5A:
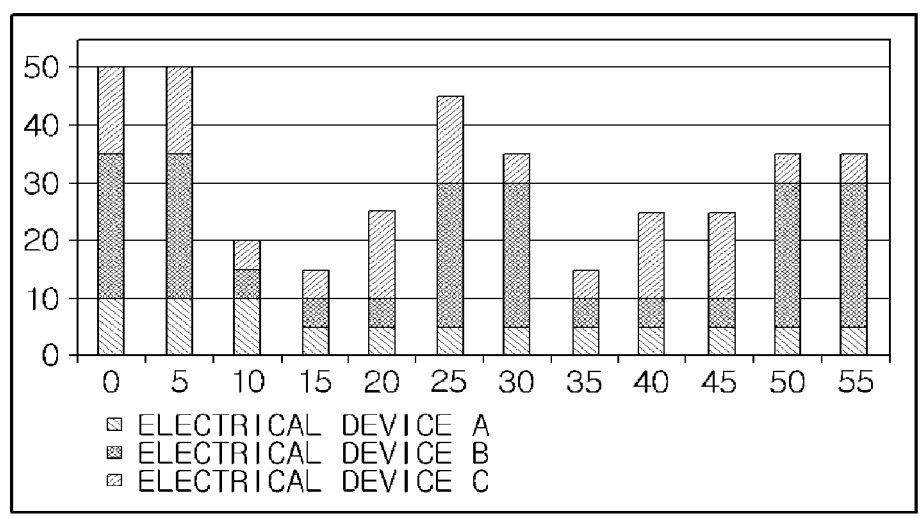
FIG. 5A is a view illustrating a consumption pattern prior to scheduling the maximum power use time according to an exemplary embodiment.
Figure 5B:
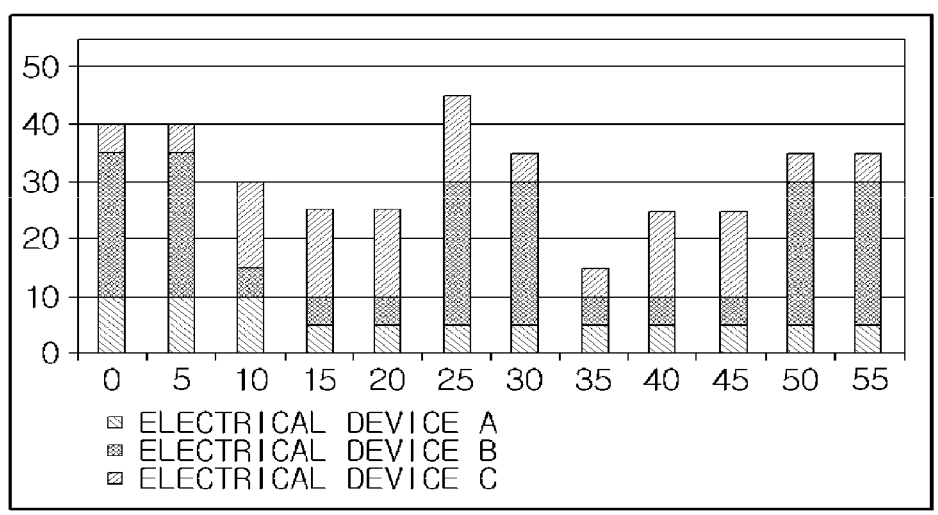
FIG. 5B is a view illustrating a consumption pattern after scheduling one electrical device in one scheduling interval according to an exemplary embodiment.
Figure 5C:
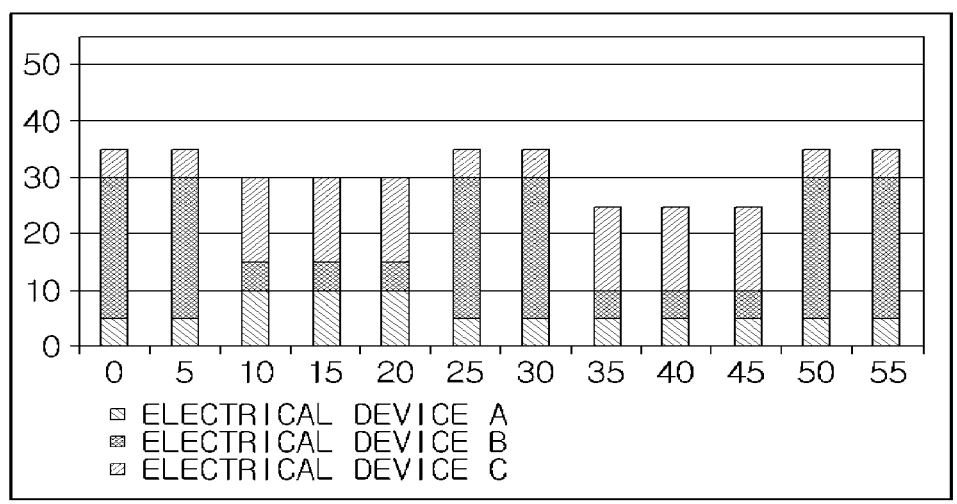
FIG. 5C is a view illustrating a result of applying the first scheduling to all scheduling intervals according to an exemplary embodiment.

FIGS. 5A-5C are views illustrating a result of the total power consumption all the electrical devices at respective intervals after scheduling maximum power use time according to an exemplary embodiment.

Specifically, FIG. 5A shows a consumption pattern prior to scheduling the maximum power use time, FIG. 5B shows a consumption pattern after scheduling one electrical device in one scheduling interval, and FIG. 5C shows a result of applying the first scheduling to all scheduling intervals.

Referring to FIG. 5A, the difference between the maximum power consumption and the minimum power consumption is greater and the power consumption pattern is not uniform. Referring to FIG. 5B, after applying the power use time scheduling to one electric device in one scheduling interval, the level of the peak power is decreased by a certain amount compared with FIG. 5A, and the maximum power consumption is decreased, as shown in FIG. 5C, by 30% compared to FIG. 5A according to a result of performing an overall power use time scheduling on the scheduling. Referring now to FIG. 3, the power scheduling module 223 of the maximum demand power controller 220 may perform a scheduling for maximum demand power control according to another exemplary method capable of reducing maximum power use amount by using renewable energy.

For example, by using the renewable energy during a time period in which the maximum power consumption is requested and not using the renewable energy in other times, scheduling may be performed to maximize a power saving effect while minimizing a storage capacity for storing the renewable energy. In other words, the power scheduling module 223 may determine a priority by using a sum of power consumption of a plurality of electric devices according to the scheduling result described above and perform scheduling such that a certain amount of the renewable energy available per hour can be used for a determined interval according to the priority.

Table 8 shows a result of performing a power use scheduling by using renewable energy according to another exemplary embodiment.

TABLE 8

| | | Priority | When a priority is considered | | | When a priority is not considered | | |
|---|---|---|---|---|---|---|---|---|
| Operation Start Time (min) | Sum of Power Consumption (kW) | for Using Renewable Energy | Renewable Energy Consumption (kWh) | Renewable Energy Residue (kWh) | Requested Power Amount (kW) | Renewable Energy Consumption (kWh) | Renewable Energy Residue (kWh) | Requested Power Amount (kW) |
| 0 | 35 | 1 | 35.0 | 22.1 | 0.0 | 35.0 | 22.1 | 0.0 |
| 5 | 35 | 1 | 35.0 | 19.2 | 0.0 | 35.0 | 19.2 | 0.0 |
| 10 | 30 | 2 | 30.0 | 16.7 | 0.0 | 30.0 | 16.7 | 0.0 |
| 15 | 30 | 2 | 30.0 | 14.2 | 0.0 | 30.0 | 14.2 | 0.0 |
| 20 | 30 | 2 | 30.0 | 11.7 | 0.0 | 30.0 | 11.7 | 0.0 |
| 25 | 35 | 1 | 35.0 | 8.8 | 0.0 | 35.0 | 8.8 | 0.0 |
| 30 | 35 | 1 | 35.0 | 5.8 | 0.0 | 35.0 | 5.8 | 0.0 |
| 35 | 25 | 3 | 0.0 | 5.8 | 25.0 | 25.0 | 3.8 | 0.0 |
| 40 | 25 | 3 | 0.0 | 5.8 | 25.0 | 25.0 | 1.7 | 0.0 |
| 45 | 25 | 3 | 0.0 | 5.8 | 20.0 | 20.4 | 0.0 | 4.6 |
| 50 | 35 | 1 | 35.0 | 2.9 | 0.0 | 0.0 | 0.0 | 35.0 |
| 55 | 35 | 1 | 35.0 | 0.0 | 0.0 | 0.0 | 0.0 | 30.0 |

Referring to Table 8, three priorities of 35 kW, 30 kW, and 25 kW exist for the sum of power consumption as a result of applying the scheduling according to an exemplary embodiment, and a use right to the renewable energy may be preferentially given to 35 kW, which is greater power consumption. The priority of the renewable energy is determined based on the sum of the power consumption. Even in a case of a higher temporal order, use of the renewable energy is stopped in an interval with a lower priority.

Table 8 shows an example of setting a priority according to the sum of the power consumption of each time interval and allocating the renewable energy according to the priority when power amount of available renewable energy per one hour is 25 kWh. When the priority is considered, the renewable energy is not to be used in an interval using 25 kW, which is a third priority.

Accordingly, the maximum demand power controller according to an exemplary embodiment may transmit, to the smart box, second power use scheduling information including whether to use the renewable energy after performing scheduling and a priority for using the renewable energy in each time interval.

Figure 6:
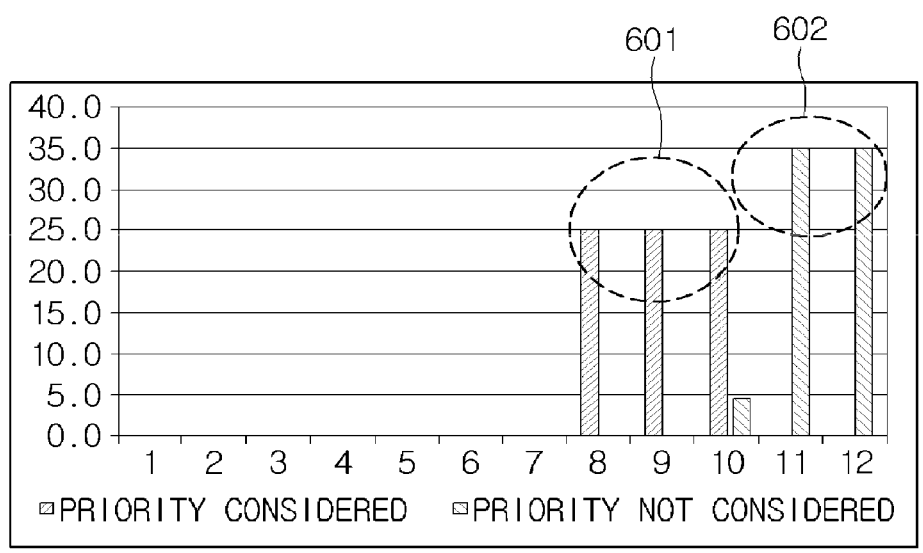
FIG. 6 is a view illustrating a request power amount when a priority for renewable energy based on a power consumption amount is reflected according to another exemplary embodiment.

A comparison result between the requested power amounts demanded from a power company are shown in FIG. 6 in a case of reflecting the priority for using the renewable energy based on the power consumption amount and in a case of not reflecting the priority.

FIG. 6 is a view illustrating a request power amount when a priority for renewable energy based on a power consumption amount is reflected according to another exemplary embodiment.

Referring to FIG. 6, the requested maximum power use amount in a case (601) of using the renewable energy by considering the priority is 25 kW, which is about 30% lower than 35 kW of a case (602) where the priority is not considered.

According to an exemplary embodiment, by using the maximum demand power controller, the maximum power use time and renewable energy use time of a power consuming device may be controlled such that a maximum demand power of a consumer unit or a group of consumer units such as home or a building may be controlled.

Although exemplary embodiments have been described in detail hereinabove, it should be clearly understood that many variations, and modifications, substitutions and additions of exemplary embodiments herein taught which may be readily apparent to those skilled in the present art will still fall within the spirit and scope of the present invention, as defined in the appended claims, and their equivalents.

What is claimed is:

1. A power control method comprising:
receiving, performed by at least one processor, a plurality of power use request information associated with a plurality of electrical devices;
calculating, performed by the at least one processor, a power consumption of the plurality of the electrical devices and an average value of the power consumption in a predetermined time period, based on the plurality of the power use request information;
comparing, performed by the at least one processor, the average value and the calculated power consumption in the predetermined time period to determine at least one scheduling interval in which the calculated power consumption is greater than the average value; and
performing, performed by the at least one processor, a scheduling in which a maximum power use time of at least one electrical device included in the at least one determined scheduling interval is moved to another interval,
wherein the power use request information comprises at least one from among time information and power consumption information, related to the operation of each of the plurality of the electrical devices.

2. The power control method of claim 1, wherein the calculating the power consumption comprises:
summing, performed by the at least one processor, the plurality of the power use request information to obtain power consumption information requested by the plurality of the electrical devices for each interval of a plurality of intervals corresponding to the predetermined time period; and
obtaining, performed by the at least one processor, an interval specific power consumption based on the power consumption information requested by the plurality of the electrical devices for each interval of the plurality of intervals and obtaining an average of the power consumption of the plurality of intervals, and
wherein the power use request information further comprises at least one from among operation start time information, maximum power consumption information, information about a time period during which maximum power consumption continues, general power consumption information, and offset information of the maximum power use time, including information about an initial operation or a possible operation delay time.

3. The power control method of claim 1, wherein comparing the average value and the calculated power consumption further comprises:
determining, performed by the at least one processor, a scheduling priority based on the calculated power consumption of each interval of a plurality of intervals with respect to the determined at least one scheduling interval.

4. The power control method of claim 1, wherein performing a scheduling further comprises:
selecting, performed by the at least one processor, at least one electrical device to be scheduled based on offset information of the maximum power use time including information about an initial operation or operation delay time included in the power use request information of the plurality of electrical devices in the at least one scheduling interval, which is specified according to a priority; and
determining, performed by the at least one processor, a scheduling priority based on the maximum power consumption information of each electrical device of the plurality of electrical devices with respect to the selected at least one selected electrical device.

5. The power control method of claim 4, further comprising:
performing, performed by the at least one processor, the scheduling in which the maximum power use time of the selected at least one electrical device is moved to the interval to be scheduled based on the offset information of the maximum power use time including the information about the initial operation or the operation delay time according to the priority.

6. The power control method of claim 5, wherein the performing the scheduling comprises:
comparing, performed by the at least one processor, an interval specific power consumption of the interval to be scheduled to determine whether to perform the scheduling; and
performing, performed by the at least one processor, the scheduling in association with moving the maximum power use time of each electrical device of the plurality of electrical devices according to the determination result.

7. The power control method of claim 6, wherein when the interval to be scheduled includes two or more intervals, an interval from among the two or more intervals having a minimum calculated power consumption is determined as the interval to be scheduled by comparing the interval specific power consumption each of the two or more intervals.

8. The power control method of claim 1, further comprising:
   generating, performed by the at least one processor, power time scheduling information including power use time information of the plurality of the electrical devices according to a result of performing the scheduling; and
   transmitting the generated power time scheduling information to a control apparatus which controls a power condition of the plurality of the electrical devices.

9. The power control method of claim 1, wherein, when a renewable energy source is provided together with power provided from a power provider, the method further comprises:
   determining, performed by the at least one processor, a priority for using the renewable energy based on the interval specific power consumption according to a result of performing the scheduling; and
   performing, performed by the at least one processor, a another scheduling in which a predetermined portion of the renewable energy source is used in a time interval according to the priority.

10. The power control method of claim 1, wherein the power consumption information comprises at least one from among a time-series power consumption data of each of the electrical devices and time-series entire power consumption data of each load in a unit of a home, building, or multi-unit building.

11. A power control system comprising:
   a gateway configured to generate a plurality of power use request information based on power consumption information of a plurality of the electrical devices; and
   a maximum demand power controller configured to receive the plurality of power use request information from the gateway, configured to calculate a power consumption of the plurality of the electrical devices in a predetermined time period based on the plurality of power use request information, and configured to perform a power time scheduling in which a maximum power use time of at least one electrical device from among the plurality of electrical devices is moved to another time period based on the calculated power consumption,
   wherein the power use request information includes at least one from among time information and the power consumption information, corresponding to the operation of each of the plurality of the electrical devices, and
   wherein the maximum demand power controller compares an average value of the calculated power consumption in the predetermined time period and the calculated power consumption to determine at least one scheduling interval in which the calculated power consumption is greater than the average value of the calculated power consumption, and moves the maximum power use time of at least one electrical device included in the at least one determined scheduling interval to an interval to be scheduled.

12. The power control system of claim 11, wherein the time information and the power consumption information comprises at least one from among operation start time information, maximum power consumption information, information about a time period during which maximum power consumption continues, general power consumption information, and offset information of the maximum power use time, including information about an initial operation or a possible operation delay time, and
   wherein the maximum demand power controller calculates the power consumption and the average value of the calculated power consumption of the plurality of the electrical devices in the predetermined time period based on the plurality of power use request information.

13. The power control system of claim 12, wherein the maximum demand power controller generates power time scheduling information including power use time information of the plurality of the electrical devices according to a result of performing the power time scheduling and transmits the power use scheduling information to the gateway.

14. The power control system of claim 11, wherein the gateway generates a control signal for controlling a power condition of each of the plurality of the electrical devices based on the power time scheduling information and transmits the control signal to a control apparatus that controls the power condition of a corresponding electrical device.

15. The power control system of claim 11, wherein the plurality of electrical devices is connected to a meter unit configured to measure an amount of power provided by the power provider and consumed by each of the electrical devices, and
   wherein the meter unit transmits the power consumption information to the gateway.

16. The power control system of claim 11, wherein when a renewable energy source is provided together with power provided from a power provider, the maximum demand power controller determines a priority for using the renewable energy based on an interval specific calculated power consumption according to a result of performing the power time scheduling and performs a another power time scheduling in which a predetermined portion of the renewable energy source is used in a time interval according to the priority.

17. A power control apparatus comprising:
   an analyzer which analyzes a power use pattern based on power consumption information of each electrical device of a plurality of electrical devices and generates power use request information for said each electrical device,
   a controller which controls the plurality of electrical devices according to power use scheduling information based on the generated power use request information,
   wherein the power use request information comprises at least one from among time information and power consumption information corresponding to the operation of each of the plurality of the electrical devices, and
   wherein the controller controls to move a maximum power use time of at least one electrical device included in at least one scheduling interval in which a calculated power consumption is greater than an average value of the calculated power consumption to another interval to be scheduled based on the power use scheduling information.

18. The power control apparatus of claim 17, further comprising:
   a storage module which stores the power use request information; and
   a communication module which receives the power consumption information about the plurality of electrical devices and transmits the power use request information to a maximum demand power controller.

19. A power control system comprising:
   a power use information device which calculates power consumption information of a plurality of electrical devices in a predetermined time period based on power use request information of each of the plurality of electrical devices;
   a power scheduler which performs scheduling in which a maximum power use time of at least one electrical device from among the plurality of electrical devices is moved based on the calculated power consumption, wherein the power use request information comprises at least one from among time information and power consumption information corresponding to the operation of each of the plurality of the electrical devices, wherein the power use information device calculates the power consumption and an average value of the calculated power consumption of the plurality of the electrical devices in the predetermined time period based on the plurality of power use request information, and wherein the power scheduler determines at least one scheduling interval in which the calculated power consumption is greater than the average value of the calculated power consumption, and moves the maximum power use time of at least one electrical device included in the at least one determined scheduling interval to another interval to be scheduled.

20. The power control system of claim 19, further comprising:
a storage module which stores data obtained by the power use information device and the power scheduler; and
a communication module which receives the power use request information of each of the plurality of electrical devices and transmits the power consumption information.

* * * * *